March 11, 1958  R. R. HARR  2,826,269
VEHICLE FRAME-ENGAGING TYPE LIFT
Filed Nov. 30, 1953  3 Sheets-Sheet 1
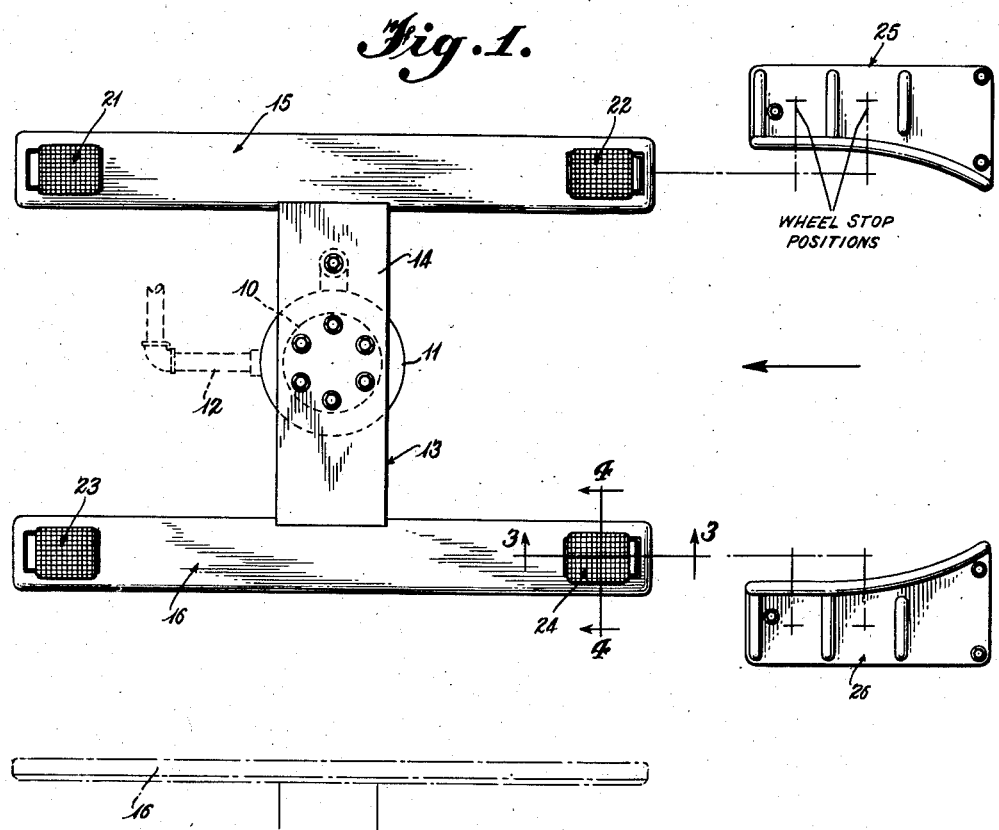
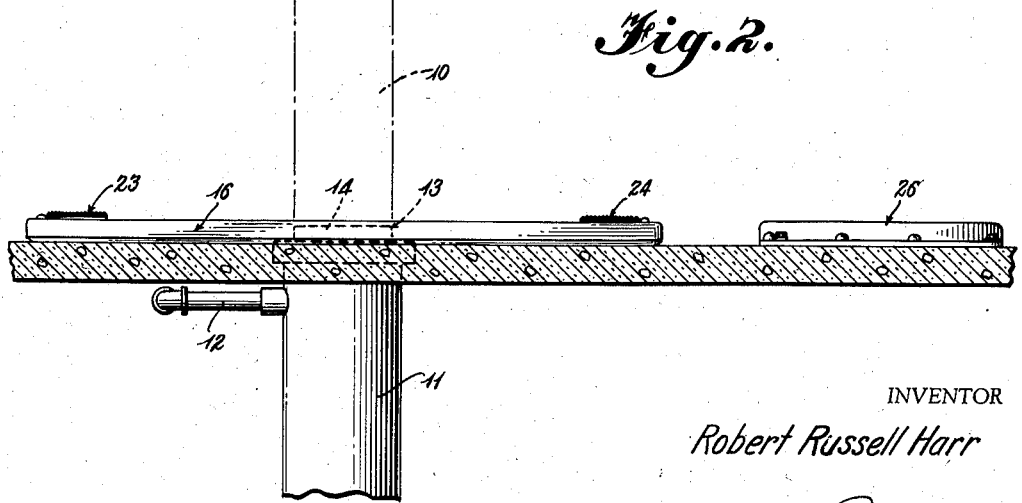
INVENTOR
Robert Russell Harr
ATTORNEY

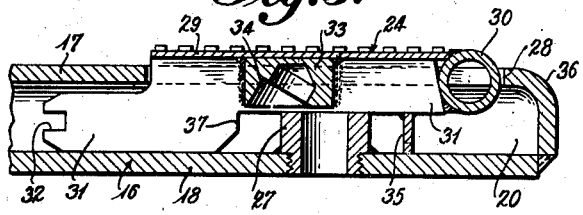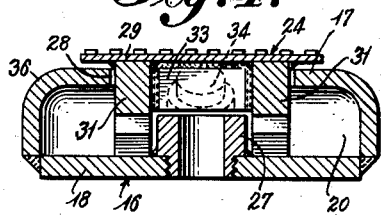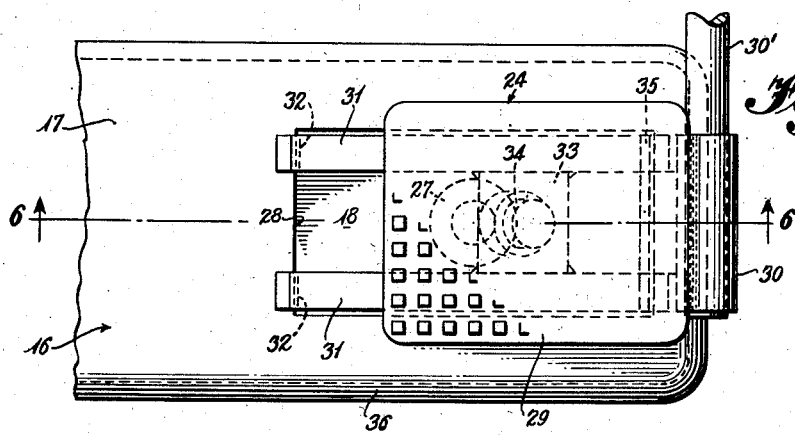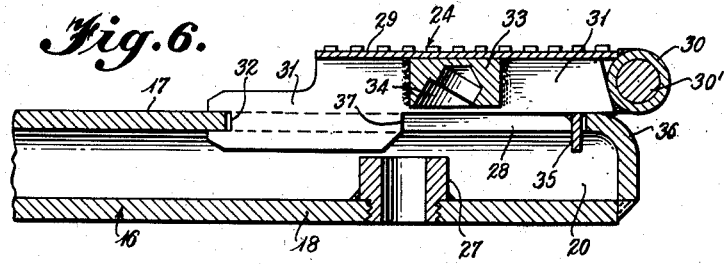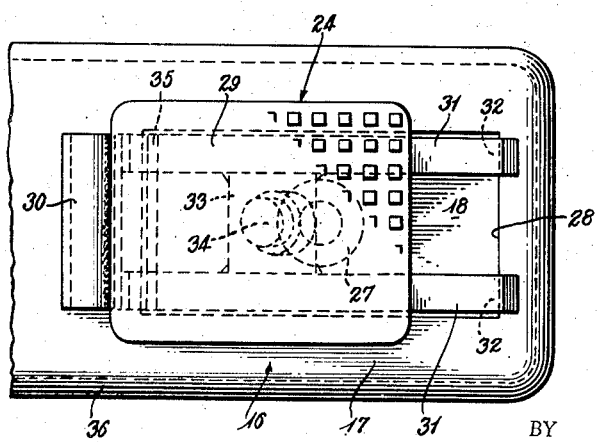

March 11, 1958  R. R. HARR  2,826,269
VEHICLE FRAME-ENGAGING TYPE LIFT
Filed Nov. 30, 1953  3 Sheets-Sheet 3
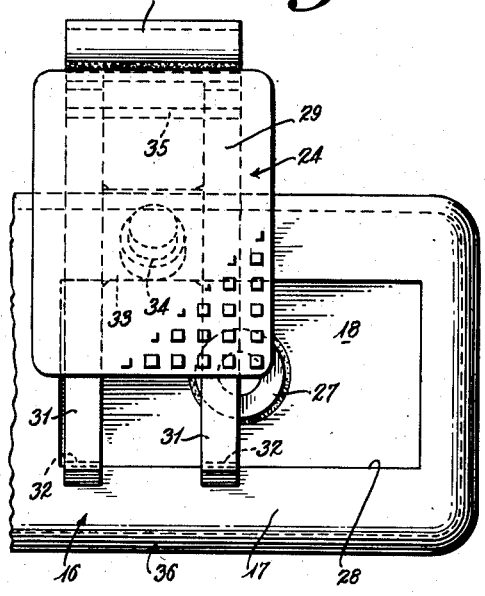
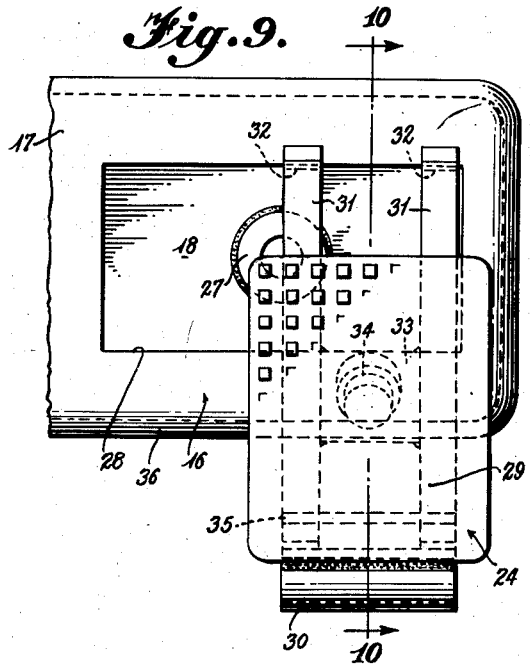
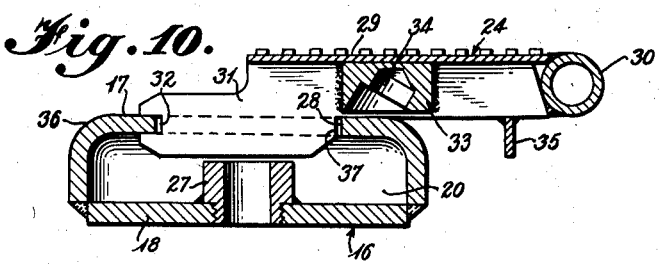
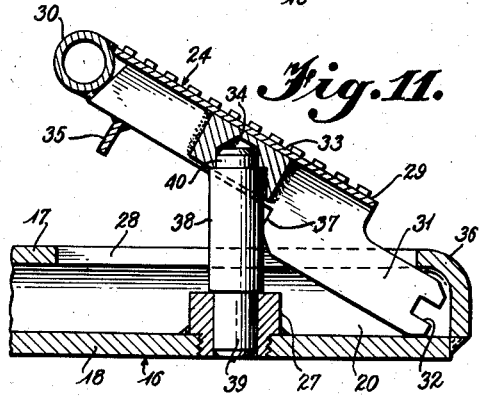
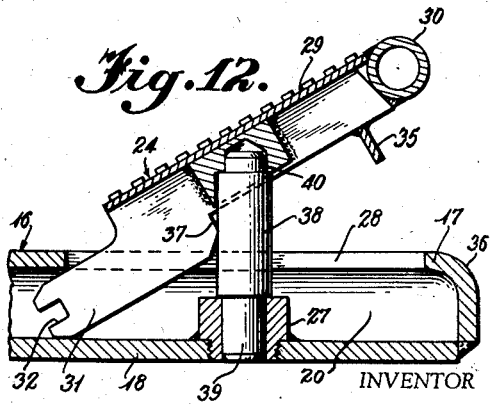
INVENTOR
Robert Russell Harr
BY
ATTORNEY

United States Patent Office 2,826,269
Patented Mar. 11, 1958

2,826,269

VEHICLE FRAME-ENGAGING TYPE LIFT

Robert Russell Harr, Fruitland, Md., assignor to The Wayne Pump Company, Salisbury, Md., a corporation of Maryland Application November 30, 1953, Serial No. 395,089

3 Claims. (Cl. 187—8.75)

This invention relates to vehicle lifts and more particularly to a vehicle lift of the type which engages the frame rather than the wheels, axles, housings or other underparts of the vehicle.

Lifts adapted to engage the underframe of a vehicle have heretofore been suggested. The present invention resides in an improved type of frame-engaging lift over those heretofore known in that its superstructure is of hollow-box construction rather than of the usual flat plate, I-beam or T-beam type. This construction not only provides strength and rigidity to the extent required but permits the storage of adaptors within recesses in the superstructure itself. Another feature is that the adaptors normally lay flat within the superstructure. This is particularly advantageous when the lift is not in use and in lowered position at approximately ground level, in that a substantially flat surface is presented without protrusions, sharp edges or upwardly extending portions that may cause accidents or form a hazard.

Another advantage of lifts as herein set forth is that contact with the underframing of the vehicle being supported is accomplished by bringing into engagement with such underframing flat plates or surfaces presenting substantial areas. This provides firm engagement between the load and lift to secure the vehicle in place during the lifting operation. It also overcomes damage to the underframing which has resulted from single point or line contact incident or use of devices of generally similar character heretofore proposed.

Other advantages of this invention will be apparent upon consideration of the following detailed description of a preferred embodiment thereof in conjunction with the annexed drawings wherein:

Figure 1 is a top plan view of a lift embodying features of the present invention;

Figure 2 is a view in side elevation of the lift of Figure 1, the raised position being indicated in broken lines;

Figure 3 is a view in section to an enlarged scale taken on the line 3—3 of Figure 1 and showing a vehicle frame-engaging adaptor member in its recessed or stored position within a lift frame rail;

Figure 4 is a view in section taken on line 4—4 of Figure 1 and showing the same adaptor as that shown in Figure 3 but from a plane at right angles to the plane of Figure 3;

Figure 5 is a top plan view of an adaptor in a position extended from but aligned with the frame rail;

Figure 6 is a view in longitudinal section taken on the line 6—6 of Figure 5;

Figure 7 is a view in top plan of an adaptor in its innermost position aligned with the frame rail;

Figure 8 is a top plan view of an adaptor extending inwardly at right angles to the length of the frame rail;

Figure 9 is a top plan view of an adaptor extending outwardly at right angles to the length of the frame rail;

Figure 10 is a view in section taken on the line 10—10 of Figure 9;

Figure 11 is a view in longitudinal section of an adaptor in sloping position relative to the supporting rail; and Figure 12 is a view similar to Figure 11 but showing an adaptor sloping in the opposite direction to that of Figure 11.

Referring now to the drawings in greater detail, it can be seen that the lift is comprised of a central piston 10, mounted to reciprocate in a cylinder 11 in response to changes in the pressure of a working fluid delivered through a line 12. The piston 10 carries on its upper end a frame 13 which is H-shaped as viewed in plan. The crossbar 14 of the frame 13 extends symmetrically on both sides of the piston 10 and carries at its ends rails 15 and 16. The rails 15 and 16 are hollow and are comprised of spaced upper plates 17 and lower plates 18. The upper plates 17 have a rectangular aperture near each end. Since the lower plates are spaced below the upper ones, the apertures in the upper plates lead to cavities or sockets. Into these cavities there are placed frame-engaging adaptors 21, 22, 23 and 24, respectively. These adaptors are arranged to connect with respective sockets in a large number of different ways so that they can be adjusted longitudinally, transversely and vertically at an angle to engage the frame elements of different types of automobiles.

In order that the frame elements may be registered longitudinally of the rails 15 and 16, a spotting tread is provided for each rail. The spotting tread 25 effects alinement with the rail 15, and the spotting tread 26 with the rail 16. When the rear wheels of the vehicle are at the right position on the treads 25 and 26, the frame elements will register with the adaptors 21 to 24, inclusive, if the adaptors are also in the proper position of adjustment on the rails.

It is proposed that the present invention be used with a chart which will give, under the name of each model of automobile, the proper spotting of the rear wheels on the members 25 and 26 and the proper position of the adaptors 21 to 24, inclusive, relative to their supporting rails.

By reference to Figures 3 to 12, inclusive, the various positions which the adaptors may assume can be understood, as well as the details of construction of the adaptors and the sockets in which they fit. In Figures 3 and 4, the details of the adaptor 24 are shown. Note that the rail 16 has near its end a boss 27 extending vertically from the plate 18 into the socket underlying the rectangular aperture at 28 in the upper plate 17. It will be noted that the aperture at 28 is about the same length as the load contacting plate 29 of the adaptor 24 but somewhat narrower than its width. The plate 29 is generally rectangular in plan, and at one end there is welded to it a tube 30 extending transversely thereof. Lengthwise beneath the plate 29 there extend parallel arms 31, notched at 32 at their free ends. The arms 31 are symmetrically disposed on opposite sides of the long axis of the plate 29 and are spaced apart a distance about equal to the width of the aperture at 28. Almost centrally disposed and depending from the under surface of the plate 29 there is a lug 33 having therein an obliquely disposed cavity 34. The lug 33 lies between and is welded to the arms 31, and the arms 31 are also welded to the tube 30. A transverse stop bar 35 is welded to and depends from the arms 31 near their ends opposite to the notches 32. The stop bar 35 extends to the lower plate 18 and with the arms 31 supports the adaptor 24 within the socket when in the position shown in Figures 3 and 4.

If reference is made to Figures 3, 4 and 5, it will be seen that the arms 31, the lug 33, the transverse tube 30 and the transverse bar 35, welded together, constitute an exceedingly strong and rigid structure. Aside from rendering the plate 29 exceedingly strong and capable of supporting very great weights, these parts coact with the rail structure in a way which permits the location of the adaptor in a wide variety of different positions. For example, if the vehicle frame elements which are to be contacted lie longitudinally further apart than the space between adaptors 21 and 22 and 23 and 24, respectively, it is possible to arrange the adaptors so that they will be mutually further apart lengthwise of the rails. To do this, each adaptor is lifted out of the cavity from the Figure 3 position and the notches 32 in the arms 31 are engaged with the edge of the upper plate 17 of the rail 16. The bar 35 functions to stop axial displacement of the adaptor which would result in disengagement from the Figure 6 position. It will be noted the outer edges of upper plate 17 are rounded as indicated at 36.

Sometimes vehicle frame elements require to be supported intermediate the rails, and in this case, a bar 30¹ can be run through the tubes 30 to form a bridging structure between the rails 15 and 16 at either or both ends of the lift. Alternatively each adaptor may be provided with a separate bar 30¹ to serve as a support.

In Figure 7, there is shown the disposition of the typical adaptor 24 when the vehicle frame elements to be engaged are closer together longitudinally of the rails 15 and 16 than are the respective adaptors when recessd as shown in Figure 2. In this case, the Figure 6 position is reversed so that the notched ends of the arms 31 engage the edge of the aperture 28 nearer the end of the rail while the bar 35 engages the relative opposite end of the aperture 28 in the upper plate 17.

In Figure 8, an arrangement is shown where the adaptors will define a vehicle frame support with load engaging plates closer together than the distance between the rails 15 and 16. In Figures 9 and 10, the arrangement is shown where the adaptors are to be further apart than the distance between rails 15 and 16. In either case, the arms 31 transmit the load to plate 17, the notches 32 engaging one side of the upper plate 17, as can be very clearly seen in Figure 10. If reference is made to the shape of the arms 31, which is apparent from Figures 3, 6 and 10, it will be noted that the dependent portion of each arm 31 terminates in a shoulder at 37, which is opposite and substantially in the plane of the notch 32. This shoulder coacts with the opposite long side of the rectangular aperture 28 in the upper plate 17 of the rail 16 to hold the adaptor in locked position when under load applied downwardly.

Not only can the adaptors be placed in different flat positions, but they may be also disposed in sloping or angular positions by the use of a pin 38, having an end 39 which fits in the boss 27 and an end 40 which fits in the cavity 34 of the lug 33. The adaptors may be made to tilt toward or away from the ends of the rails, as can be seen by comparative study of Figures 11 and 12.

While the entire description of Figures 3 to 12, inclusive, has been concerned with the different positions which the adaptor 24 may assume, it is to be understood that all of the adaptors may assume the same relative position at the same time, whereby the load borne by the adaptors is symmetrically distributed around the piston 10. An example of this will suffice to show the applicability to all cases. If the treads are arranged to extend outwardly of the rail, as in Figure 10, the adaptor 24, shown in Figure 10, will extend to the right from the rail 16 as it is shown in that figure. On the other hand, the corresponding adaptor 22 would extend to the left from the rail 15 if it were shown in plane of the section line 10—10.

It will be noted that regardless of the position of the adaptors they are held by the arms 31 against pivotal movement induced by the load. Pivotal movement in the opposite direction releases the adaptor, but accidental release, as by sliding, is prevented by some other part, for example the tube 30 in Figure 3, the bar 35 in Figure 6, the shoulder 37 in Figure 10, and the pin 38 in Figures 11 and 12.

While as stated above, the adaptors may be arranged symmetrically about the vertical axis of the piston 10, as can be readily seen, they also may be arranged asymmetrically if that be needed for a particular installation. For instance, the adaptors toward the forward end of the vehicle may be disposed inwardly of the frame while the adaptors toward the rear end may be disposed outwardly or angularly. Thus, there is provided versatility of a high order to the structure considered as a whole and yet the number of parts comprising the structure is relatively few.

The piston and cylinder arrangement which actuates the lift frame per se forms no part of the present invention. It is understood that the piston will be actuated hydraulically by means well known to those skilled in the art. Accordingly, this specification contains no description of the hydraulic actuator mechanism.

What is claimed is:

1. A load-bearing device comprising a hollow bar having substantially flat upper and lower walls spaced from each other in substantially parallel relationship, an opening in said upper wall and a support shoe adjustably mounted in said opening, said shoe comprising a generally flat plate, a tubular rod connected to one edge of said plate and extending parallel to said one edge, a pair of laterally spaced arms extending forwardly from the opposite edge of said plate, said arms being downwardly offset from said plate and being each provided with a slot on the free ends thereof, a lug depending from said plate, said lug being in the same horizontal plane but spaced from said arms, said plate, arms and lug being so constructed relative to said opening that when said plate is inserted into said opening in such a manner that the plate, in combination with the hollow tube, substantially fills the opening, the arms and lug are adapted to contact the inner surface of the lower wall, whereas when said arms and lug are inserted into said opening in such a manner that the slots in said arms engage one edge defining said opening while said lug contacts the opposite edge, said plate is spaced above said opening.

2. The device of claim 1 wherein a socket extends upwardly from the lower inner surface of said hollow bar toward said opening, and a second socket extending downwardly from said shoe, said sockets being constructed to receive the opposite ends of a removable post for supporting said shoe in inclined position.

3. In a load-bearing device, a hollow bar having substantially flat upper and lower walls in approximately parallel relation, an aperture in said upper wall, supporting means adjustably mounted in said aperture, said supporting means comprising a generally flat plate having laterally spaced arms extending therefrom downwardly and outwardly and substantially parallel thereto, said plate having an under portion adapted to engage with and bear upon an outer surface of said upper wall, and said arms having means adjacent the free ends thereof adapted to engage with an edge of said aperture when the underportion of said plate is in engagement with the outer surface of said upper wall.

References Cited in the file of this patent

UNITED STATES PATENTS

| | | |
|---|---|---|
| 1,975,729 | Mulhollen | Oct. 2, 1934 |
| 2,581,137 | Pelouch | Jan. 1, 1952 |
| 2,592,845 | Aron | Apr. 15, 1952 |
| 2,593,635 | Walker | Apr. 22, 1952 |
| 2,612,355 | Thompson | Sept. 30, 1952 |
| 2,637,522 | Wallace | May 5, 1953 |
| 2,659,455 | Green | Nov. 17, 1953 |